Patented Dec. 3, 1929

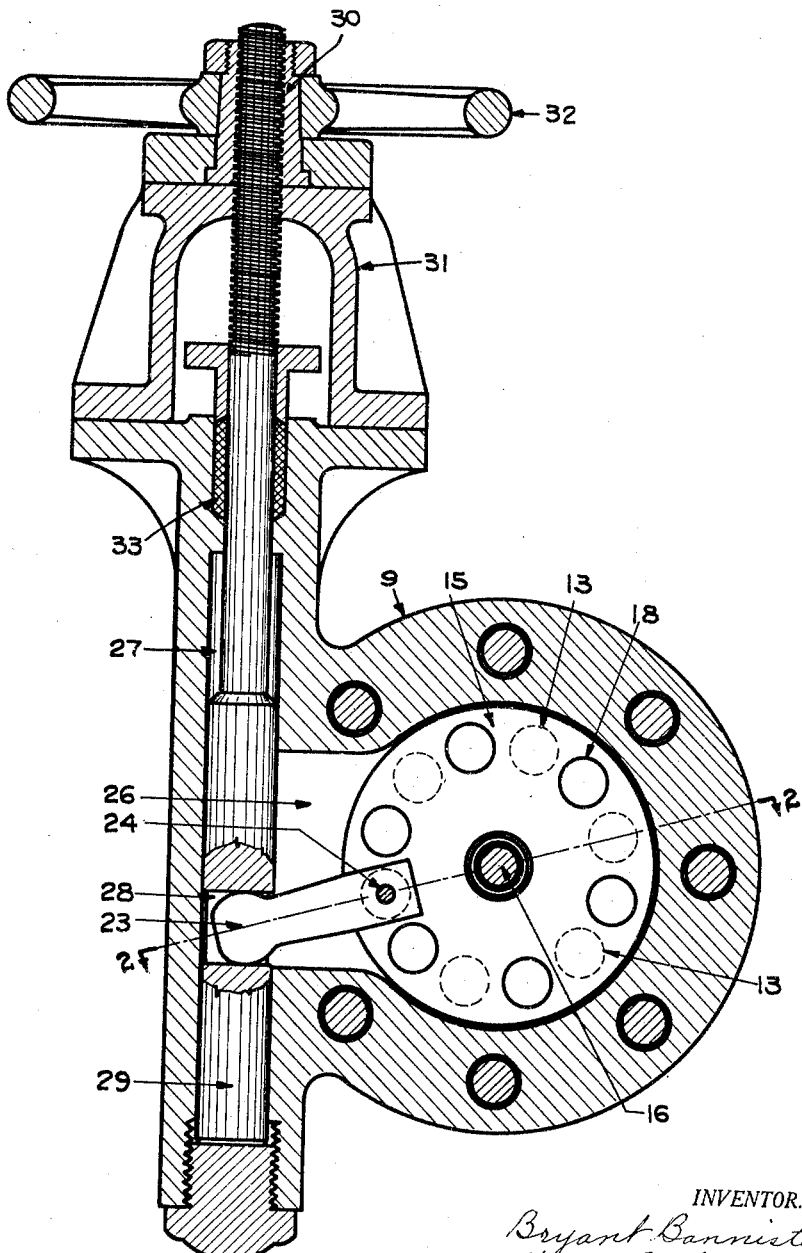

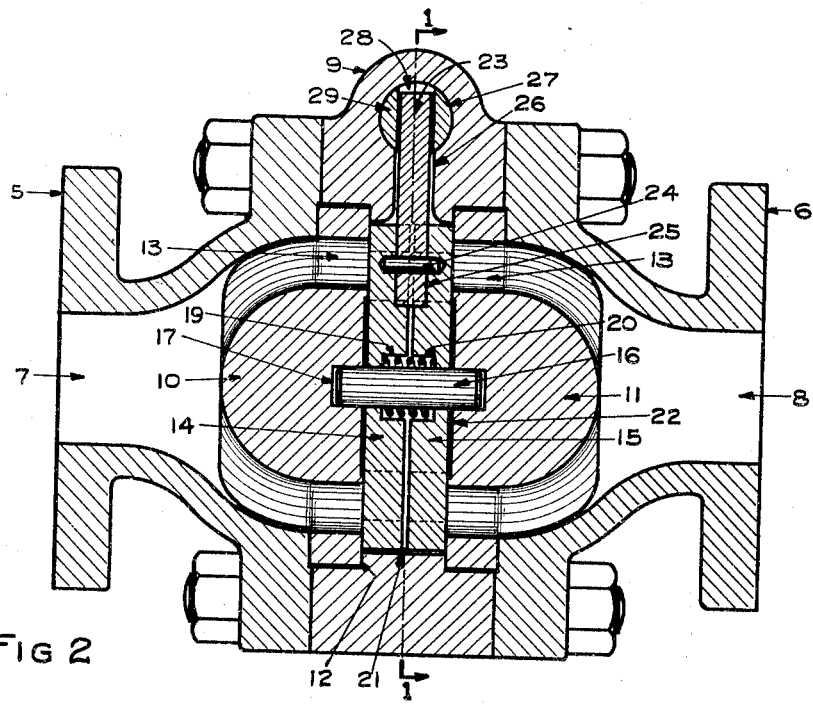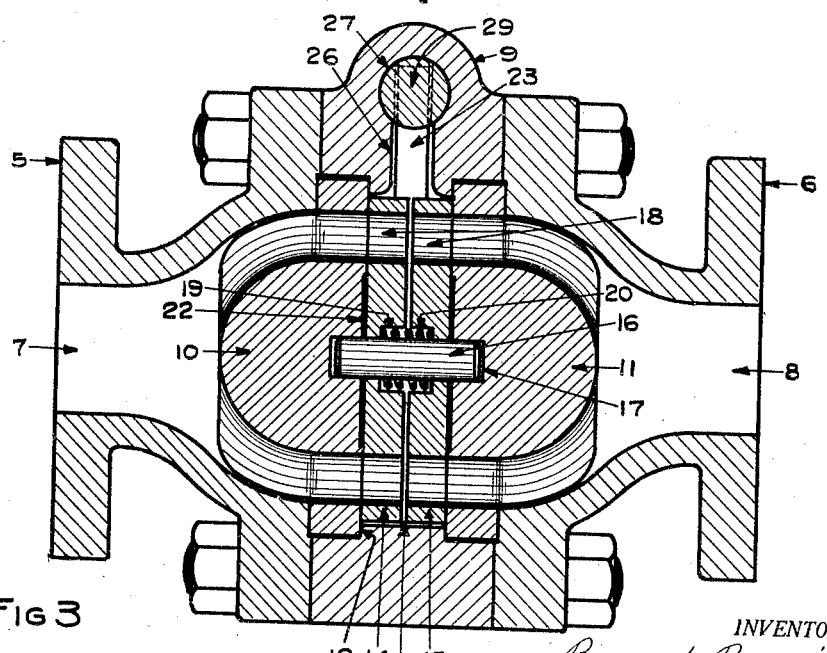

1,738,135

UNITED STATES PATENT OFFICE

BRYANT BANNISTER, OF PITTSBURGH, PENNSYLVANIA

VALVE

Application filed February 11, 1925. Serial No. 8,389.

This invention relates to valves and more particularly to multi-port disc valves such as are adapted for use in high pressure steam lines and similar places.

An object of this invention is to provide a valve of the type described wherein all pressure parts can be forged, and of such design that the valve parts proper are free to expand in all directions without stressing the valve body, so that the said parts can be made of the most suitable material without regard to their expansion characteristics.

A further object is to provide a valve of the type set forth, in which the pressure of the fluid traversing the valve or the fluid pressure in the pipe line with which the valve is associated is utilized to assist in pressing a valve disc against the associated seat so as to eliminate all chattering of the disc. Such a construction also accomplishes an additional object of this invention, namely, the provision of a valve which is especially suited to throttling service, since the pressure of the disc upon the associated seat protects the latter from the erosive action of the fluid which would otherwise occur.

When the requirements are such that a valve of minimum size must be used there is a consequent reduction in port area so that in the ordinary construction of valves heretofore used there has been a sudden increase in the velocity of the fluid traversing the valve as it approached the port or ports of the valve seat and a sudden decrease in its velocity as it left the ports. This has resulted in setting up eddy currents, and other drawbacks, which greatly affect the rate of flow, and materially reduce the efficiency of the valve. A still further object of the invention is to provide a highly efficient valve of the type set forth so constructed as to provide a gradual increase in the velocity of the fluid from the valve inlet to the ports of the valve seat without causing any abrupt change in the rate of flow and to provide a gradual decrease in the velocity of the fluid from the valve ports to the outlet without causing any abrupt variation in the rate of flow.

These and other objects which will be obvious to those skilled in this particular art are accomplished by means of this invention, one embodiment of which is shown for the purposes of illustration in the accompanying drawing, in which Figure 1 is a transverse section through the valve body on the line 1—1 of Fig. 2, showing the control mechanism for opening and closing the valve. Fig. 2 is a cross section on the line 2—2 of Fig. 1, showing the valve disc in position to close the ports of the valve seats and Fig. 3 is a similar view, showing the valve open.

The particular embodiment of this invention which is illustrated in the drawings contemplates the provision of two housing members having aligned openings for the passage of fluid therethrough. A central spacing member which accommodates the valve operating rod is provided between the two housing members and the latter are bolted thereto. Two circular plug-like members, each of which has a circular series of valve ports are clamped within the housing against the central spacing member in such a position that the ports of each member are aligned with the ports of the other. Two valve discs having a similar series of ports are rotatably mounted between the two valve seats and are adapted to be moved so as to open or close the ports of the valve seats. Each port in each valve seat gradually increases in size from the face adjacent the valve discs to the outer face of the seat in order to provide a gradual increase in velocity of the fluid followed by a gradual decrease without abruptly affecting the rate of flow. The valve discs are each pressed against the associated valve seat and sufficient space is provided between the two discs to permit fluid pressure to enter therebetween and assist in pressing the discs against the associated seats.

The illustrated mechanism embodying the above structure consists of two housing members 5 and 6 having central inlet and outlet openings 7 and 8, respectively, for the passage of fluid therethrough. A central spacing member 9 is interposed between the housing parts 5 and 6 and the latter are securely bolted thereto. Two plug-like members, forming valve seats, 10 and 11 are clamped in spaced relation to each other between the housing members 5 and 6, respectively, and cooperating shoulders 12 on the central spacing member 9. Each valve seat is provided with a circular series of ports 13 and the valve seats are positioned so that the ports in one member are spaced from but aligned with the ports in the other member. Each port gradually increases in size from the inner face of each valve seat to the outer face, as clearly shown in Figs. 2 and 3, so that even with valves of minimum size where small ports are necessary there will be no sudden increase or decrease in the velocity of the fluid traversing the valve, but a gradual increase from the inlet opening 7 through the ports of the valve and then a gradual decrease in velocity to the outlet 8. The gradual increase in size of the ports from the inner faces of the valve seats to outer faces adjacent the inlet or outlet openings provides for this gradual change in velocity without abruptly affecting the rate of flow with the result that a valve of materially higher efficiency is provided.

Two separate valve discs 14 and 15 are rotatably mounted upon a pin 16 which is received in aligned bores 17 formed in the inner faces of the valve seats. Each disc has aligned ports 18 which provide communicating passages between the ports of the two valve seats when the valve discs are in proper position. The latter are, of course, adapted to cut off communication between the ports of the valve seats when the valve is in closed position as shown in Figs. 1 and 2. The inner face of each disc 14 and 15 has a counterbore 19 which surrounds the supporting pin 16, and a sping 20 is positioned therein so as to press each disc against the associated valve seat. The discs are of such size that a space 21 is provided between them so that the pressure of the fluid passing through the valve and the pressure in the pipe line with which the valve is associated is adapted to enter the space 21 and assist the spring in pressing the discs against their associated valve seats. The inner surface of each valve seat is cut back at 22 in order to reduce the bearing surface between the disc and the seat so as to render the former easily movable. The fluid pressure will pass around the pin 16 into the space 22 so as to more or less balance each valve disc but this pressure is obviously insufficient to force the disc away from its seat, due to the difference in area of the two sides of the discs which are subject to the fluid pressure.

The mechanism for operating the valve includes a lever 23 which is mounted upon a pin 24 in a slot 25 formed in the adjacent faces of the two valve discs. The lever extends outwardly through a slot 26 formed on the edge of the spacer member 9 and extends into a transverse bore 27 where it is received within an opening 28 formed in an operating rod 29 mounted for reciprocation in the bore 27. The outer end of the operating rod is threaded to a nut 30 mounted for rotation in a supporting cap 31 and a hand wheel 32 is secured to the nut in order to rotate it. The operating rod 29 extends through a packing 33 which is provided at one end of the bore to prevent any leakage of fluid pressure from the valve at that point.

When the valve discs are in the position shown in Figs. 1 and 2 all communication between the ports of the valve seat 10 and those of the valve seat 11 is cut off. Operation of the rod 29 through the mechanism described rotates the valve discs until their ports coincide with the ports of the valve seats as shown in Fig. 3, when the valve is in fully opened position. Fluid pressure enters between the two valve discs and assists the spring 20 in firmly pressing each disc against its associated valve seat so as to protect the latter from the erosive action of fluid passing through the valve. The pressure of each valve disc part upon its associated seat also prevents chattering thereof. The spacing between the parts renders it possible to form them from the most suitable material without regard to their expansion characteristics, since the valve parts are free to expand in all directions without producing any undesirable stress in the valve body.

What I claim as new and desire to secure by Letters Patent is:

1. A disc valve having in combination a spacing member, separate ported valve seat members, inlet and outlet housings, means for clamping said housings to said spacing member so as to clamp said valve seat members in place and a valve disc rotatably positioned between said valve seat members for controlling the flow through the ports thereof.

2. A disc valve having in combination a housing provided with a fluid inlet, a housing having a fluid outlet, a ported valve seat member removably disposed within said inlet housing and provided with passages shaped so as to gradually increase the velocity of fluid traversing the valve from said inlet to the ports of said valve seat member, a second ported valve seat member removably disposed within said outlet housing and spaced from said first seat, said second valve seat being provided with passages shaped so as to gradually decrease the velocity of said fluid as it approaches said outlet and means adapted to open and close the ports of said members.

3. A disc valve having in combination inlet and outlet housings, a spacing member therebetween, spaced ported valve seat members in said housings, means for clamping said housings to said spacing member so as to clamp said valve seat members in place and two valve discs rotatably disposed between said valve seat members for controlling the flow through the ports thereof.

In testimony whereof, I have hereunto subscribed my name this 4th day of February, 1925.

BRYANT BANNISTER.